United States Patent [19]

Martin et al.

[11] Patent Number: 5,316,434
[45] Date of Patent: May 31, 1994

[54] APPARATUS AND METHOD FOR HAULING MATERIAL OBJECTS

[75] Inventors: Clarence E. Martin, Oak Creek; David J. Burrows, Cudahy, both of Wis.

[73] Assignee: Harnischfeger Corporation, Brookfield, Wis.

[21] Appl. No.: 879,409

[22] Filed: May 7, 1992

[51] Int. Cl.⁵ ............................................. B60P 3/40
[52] U.S. Cl. .................... 414/607; 414/458; 414/786
[58] Field of Search ............... 414/23, 458, 459, 607, 414/608, 745.1, 745.5, 746.8, 786, 910

[56] References Cited

U.S. PATENT DOCUMENTS

| | | | |
|---|---|---|---|
| 2,772,918 | 12/1956 | Klinger | 414/607 X |
| 3,243,193 | 3/1966 | Fulmer et al. | 414/458 X |
| 3,631,999 | 1/1972 | Walerowski | 414/458 |
| 3,795,336 | 3/1974 | Acker et al. | 414/458 |
| 4,111,452 | 9/1978 | Carlsson | 414/607 X |
| 4,168,931 | 9/1979 | Harris | 414/458 |
| 4,362,458 | 12/1982 | Jantzi | 414/458 |
| 4,452,555 | 6/1984 | Calabro | 414/458 X |
| 4,588,345 | 5/1986 | Anttila | 414/607 X |
| 4,755,099 | 7/1988 | Belveal | 414/607 |
| 4,936,733 | 6/1990 | Girerd | 414/458 |
| 5,006,031 | 4/1991 | Fossing et al. | 414/458 |

FOREIGN PATENT DOCUMENTS 2160844  1/1986  United Kingdom ............... 414/608

Primary Examiner—Michael S. Huppert
Assistant Examiner—James Keenan
Attorney, Agent, or Firm—Richard C. Ruppin

[57] ABSTRACT

A material hauler including a first material carrier having wheels for supporting the carrier and permitting its movement along a floor surface and a second material carrier removably supported on a material handling vehicle and positioned at a distance from the first material carrier. The material object to be hauled bridges the space between the first and second material carriers and engages both of the material carriers. Thereby, the two material carriers and the material object all travel with the material handling vehicle to haul the objects. The second material carrier can be lifted above the floor surface by the material handling vehicle and includes a lower member supported on the material handling vehicle and an upper member which is pivotal relative to the lower member. The upper member supports the material object being hauled so that the lower member and the material handling vehicle can turn at corners relative to the upper member and the material object.

7 Claims, 2 Drawing Sheets

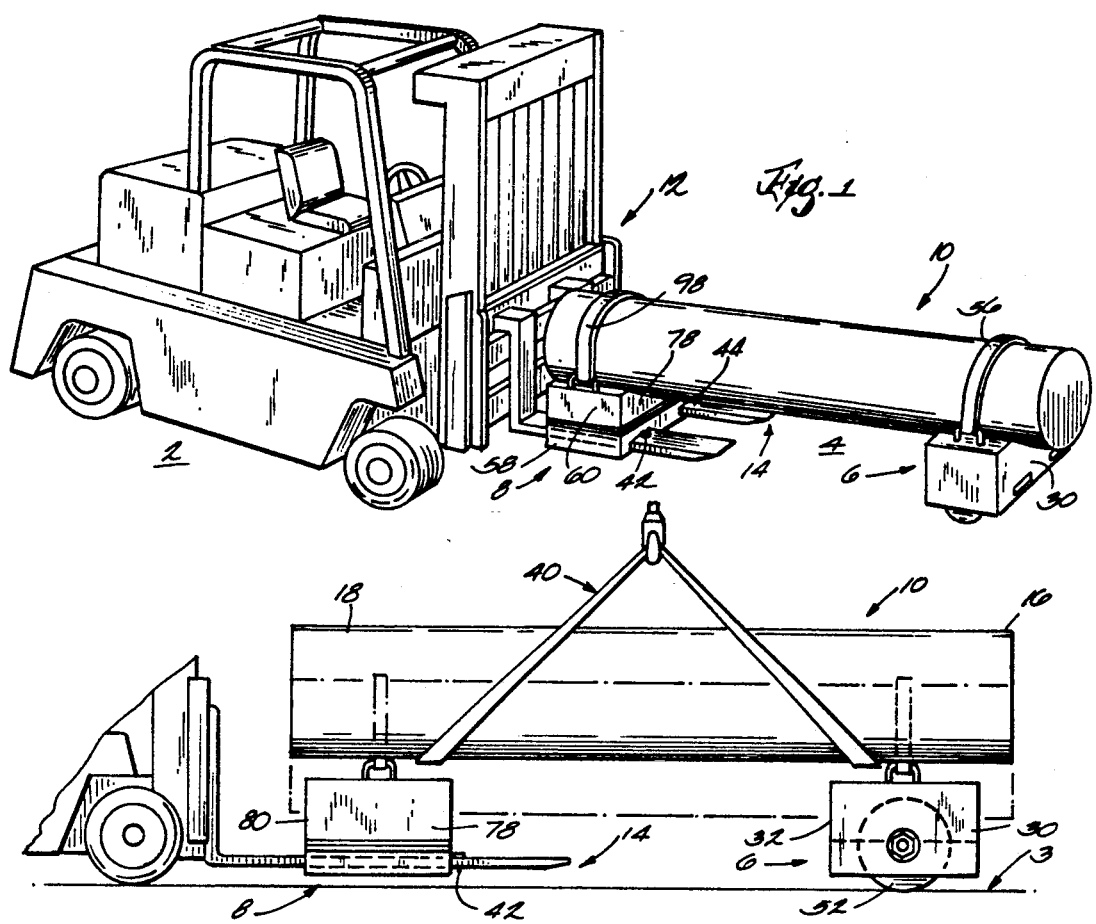
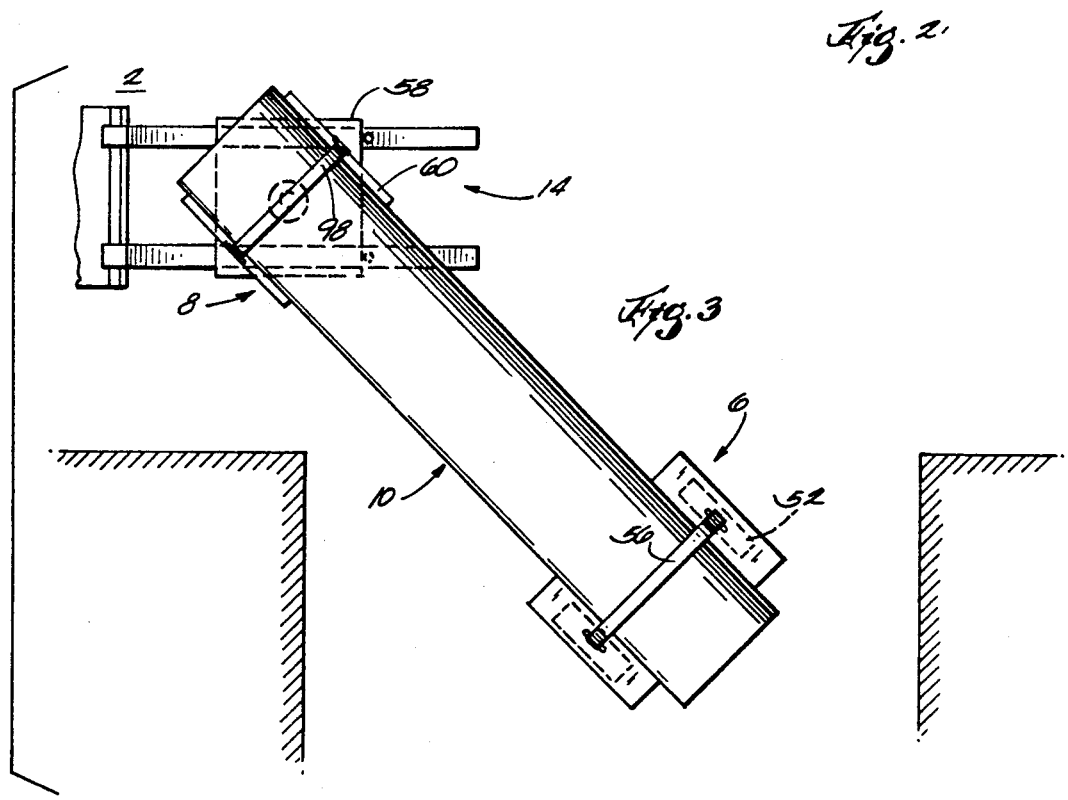

APPARATUS AND METHOD FOR HAULING MATERIAL OBJECTS

FIELD OF THE INVENTION

This invention relates to the hauling of material objects with an apparatus moved by a material handling vehicle. More particularly, the invention relates to the hauling of material objects with a two part carrier apparatus supporting the objects and moved by a material handling vehicle.

BACKGROUND OF THE INVENTION

Material handling vehicles such as fork lift trucks are commonly used in industrial and commercial facilities including manufacturing plants and warehouses to move objects from place to place within the facilities. The objects being moved must be carried on a pallet which fits the forks of a fork lift truck or must be otherwise supported or have a shape which fits or is adapted to fit the fork lift truck or other type of material handling vehicle. This, of course, limits the carrying capabilities of the material handling vehicle.

Additional limitations on the size and types of objects that may be carried by material handling vehicles relate to the space available in the industrial or commercial facility and the access provided in these facilities to the locations of the objects to be hauled. Where the objects are long, the overhead clearance may not be sufficient to carry them in an upright position or the material handling vehicle may not be capable of carrying the objects in an upright position. If the objects are either long or bulky, aisles within the facilities may be too narrow and aisle intersections may be too small to permit movement of the objects around corners. Also, the aisles may not be sufficiently high. These problems can be particularly difficult where the material handling vehicle is a fork truck type and the only secure manner of handling the object is to position it across the forks of the truck. If the object is fairly long, it will not fit through an aisle or door and raising the object in the air on the forks of the truck may make the entire apparatus unstable or there may not be sufficient overhead clearance to raise the object.

The instant invention is directed to providing an improved method and apparatus for solving problems of hauling long or bulky objects within industrial and commercial facilities.

SUMMARY OF THE INVENTION

It is a general object of the invention to provide an apparatus and method for hauling material objects in which two members support the object to be hauled and are together provided with transporting movement by a material handling vehicle.

The invention is accomplished by providing a material hauler which is in movable engagement with a material handling vehicle travelable along a floor surface. The hauler includes a first material carrier having wheels for supporting the carrier and permitting its movement along a floor surface and a second material carrier positioned at a distance from the first material carrier. The second material carrier includes a second carrier support means for supporting the second material carrier on the material handling vehicle at a position above the floor surface. The material object to be hauled bridges the space between the first and second material carriers and engages both of the material carriers. Thereby, the two material carriers and the material object all travel with the material handling vehicle to haul the objects. The second material carrier includes a means for holding the second material carrier on the lifting and lowering means of the material handling vehicle to enable the second material carrier to be lifted above the floor surface. The second material carrier may also include a lower member supported on the material handling vehicle and an upper member which is pivotal relative to the lower member. The upper member supports the material object being hauled so that the lower member and the material handling vehicle can turn at corners relative to the upper member and the material object to assist with hauling long material objects.

In using the material hauler, the first material carrier is positioned on the floor surface and the second material carrier is positioned on the load lifting and lowering means of the material handling vehicle at a distance from the first material carrier. The material object to be hauled is placed on the first and second material carriers such that it bridges the distance between the two carriers. The material handling vehicle is then moved to move the first and second material carriers and thereby haul the material object to a desired location. The material object may be placed on the second material carrier while the latter is in engagement with the floor surface. After the object is placed on the second carrier, the second carrier is raised above the floor surface by the material handling vehicle to permit the second carrier to move with the material handling vehicle.

BRIEF DESCRIPTION OF THE DRAWINGS

Further objects and advantages of the invention will appear when taken in conjunction with the accompanying drawings in which:

FIG. 1 is a perspective view of the material hauler and the material handling vehicle with a material object in place on the material hauler;

FIG. 2 is a side elevation view of the material hauler with the material object to be hauled shown in full lines suspended above the hauler and in phantom lines positioned on the hauler;

FIG. 3 is a top plan view of the material hauler and the material handling vehicle as the load object is being hauled around a corner;

DETAILED DESCRIPTION OF THE INVENTION

Figure 4:
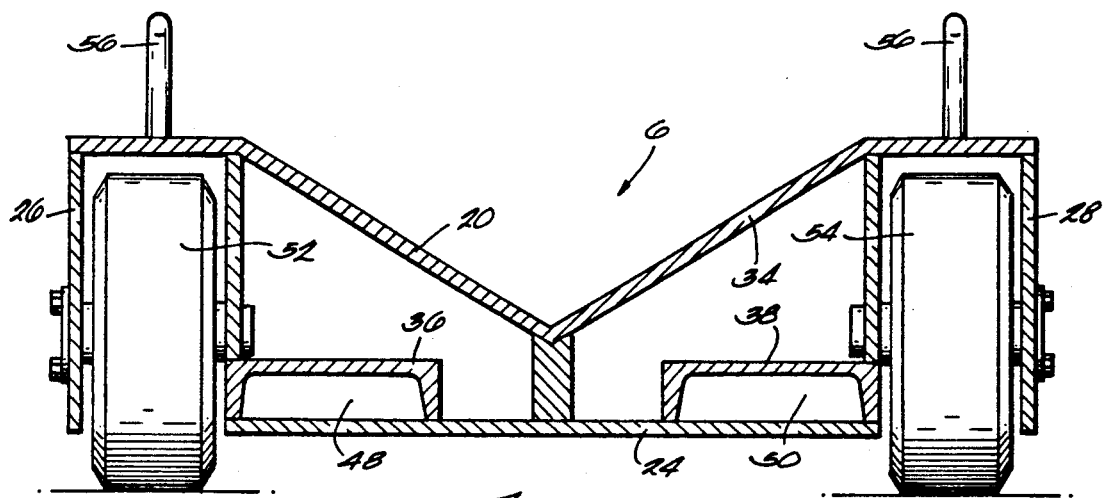
FIG. 4 is a front elevation view, partially in cross-section, of a first carrier of the material hauler.
Figure 5:
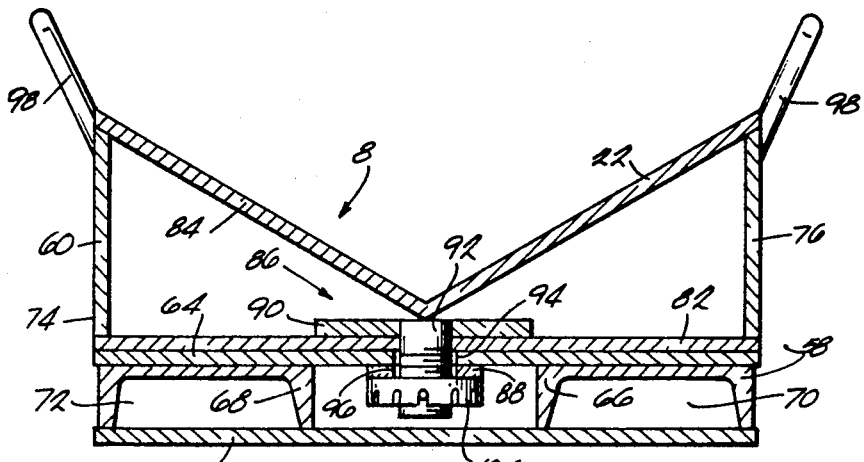
FIG. 5 is a front elevation view, partially in cross-section, of a second carrier of the material hauler.

Referring generally to FIGS. 1-3, a material handling vehicle 2 of a fork truck type, a material hauler 4, and a material object 10 being hauled by the material hauler, are shown. The material handling vehicle 2 is travelable along the floor 3 and includes a pair of forks 14 extending from a fork lift 12 which lifts and lowers the forks and any load on the forks and also can tilt the forks upward or downward to assist with retaining or releasing a load on the forks. The material hauler 4 includes a trailer or first material carrier 6 and a pivot support or a second material carrier 8 separate from the carrier 6. The material object 10 is supported at its opposite ends 16 and 18 on and bridges the first and second material carriers. The material object 10, for illustrative purposes, is a steel drum for use in a hoist. However, other types and shapes of objects which may be elongated or bulky may be carried with appropriate modifications to the respective carrying surfaces 20 and 22 of the first and second material carriers.

Figure 6:
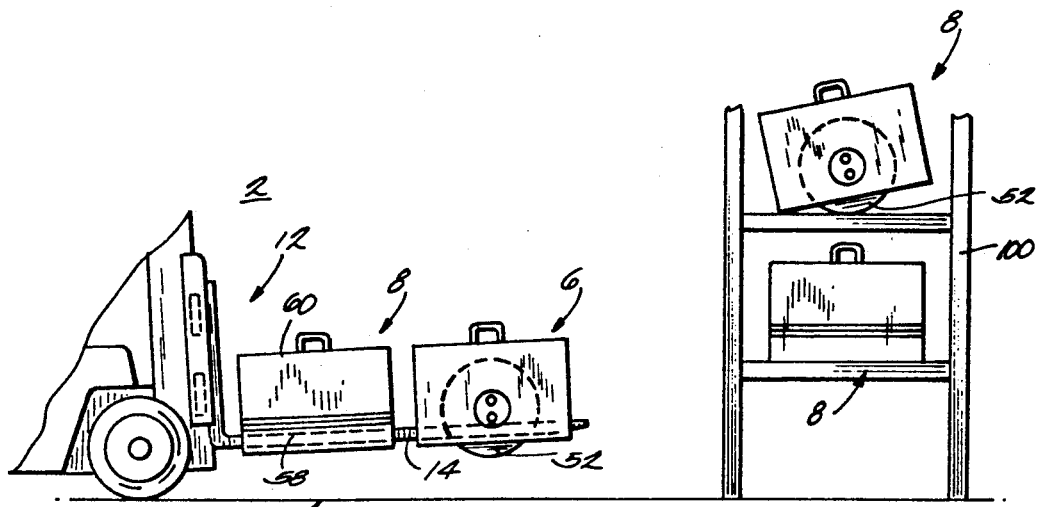
FIG. 6 is a side elevation view of the material hauler with its two carriers shown in phantom lines in a storage position on a shelf and in full lines on the material handling vehicle being transferred to another location.

The first material carrier 6 comprises a bottom wall 24, side walls 26 and 28, front wall 30, rear wall 32, and a top wall 34 having the carrying surface 20. A pair of inverted U-shaped members 36 and 38 abut the bottom wall 24 and form slots 48 and 50 extending through the first material carrier 6 between its rear and front walls. The slots 48 and 50 have dimensions sufficient to permit the forks 14 to be extended into or through the slots, as shown in FIGS. 1 and 6.

The first material carrier 6 further includes a pair of wheels 52 and 54 rotatably mounted on the first material carrier 6 for permitting movement of the first material carrier along the floor 3. The first material carrier 6 also includes object securement means 56 for holding the material object on the first material carrier if such securing is necessary. In some cases, the friction between the surface 20 and the object may be sufficient to adequately secure the object on the carrier 6, but the securement means 56 is available if desired.

The second material carrier 8 includes a lower section 58 for supporting the carrier 8 on the forks 14 and an upper section 60. The lower section 58 comprises a bottom wall 62, a top wall 64, a pair of inverted U-shaped members 66 and 68 between and affixed to the top wall 64 and bottom wall 62 which form slots 70 and 72 extending through the lower section 60 of the second material carrier. The slots 70 and 72 are dimensioned to permit the forks 14 to be extended into or through the slots, as shown in FIGS. 1 and 6. When the second carrier 8 is in a carrying position on the forks 14, as shown in FIGS. 1 and 2, retainer pins 42 and 44 prevent the carrier 8 from sliding off of the forks. The upper section 60 of the second material carrier 8 includes side walls 74 and 76, front and rear walls 78 and 80, a bottom wall 82, and a top wall 84 having the carrying surface 22. The upper section 60 is pivotally mounted on the lower section 58 by a pivot 86 having a pin receiving collar 88 affixed to the under side of the top wall 64 of the lower section 58, a pin retaining plate 90 affixed to the upper side of the bottom wall 82 of the upper section 60, a pin 92 affixed to the plate 90 and extending in a pivotally movable manner through openings 94 and 96 respectively in the wall 64 and collar 88 to thereby permit the upper section 60 to pivot on the lower section 58 of the second material carrier 8. A castle nut 102 on the lower end of pin 92 assists the retaining of upper section 60 on the lower section 58. The second material carrier 8 also includes securement means 98 for holding the material object 10 in engagement with the carrying surface 22, if necessary, to positively secure the object 10 on the carrier 8.

With reference to FIG. 2, the first material carrier 6 is shown at a position on the floor 3 at which it has been located by being deposited by the forks 14. The material handling vehicle 2 and its forks 14, along with the second material carrier 8, are shown at a spaced distance from the first material carrier which is determined by the length of the object 10 or the points on the object 10 at which it is desired to engage the object 10 with the carriers 6 and 8. In preparation for the moving of the material object into supporting engagement with the carriers 6 and 8, the second material carrier 8 has been lowered to rest on the floor by the fork lift 12. The full lines of the material object 10 in FIG. 2 show the position of the object 10 supported by a lifting means 40 at a pick-up location as the object 10 is being lowered into supporting engagement with the carriers 6 and 8. The phantom lines of object 10 in FIG. 2 show the position of the object 10 in engagement with the carriers 6 and 8 secured in place by the securement means 56 and 98. After the material object 10 is placed in engagement with the carriers 6 and 8, the fork lift 12 is operated to lift the forks 14 and thereby lift the second material carrier 8 to a position above the floor 3. The material hauler 4 and material object 10 are then moved along the floor by the material handling vehicle 2, as shown in FIG. 1.

With reference to FIG. 3, as the material object 10 is being hauled to another location, a corner may be encountered around which the material object must be moved. In such case, the upper section 60 of the carrier 8 will pivot relative to the lower section 58 to permit turning of the material hauler and load object along with the material handling vehicle around the corner.

When the material hauler is not in use, its two parts, carriers 6 and 8 may be stored at a suitable location, for example, on a storage rack 100 as shown in phantom lines in FIG. 6. The carriers are stored in a position such that the forks 14 of the material handling vehicle 2 have access to the slots 48, 50 and 70, 72 in the carriers 6 and 8. In FIG. 6, the carriers 6 and 8 are shown stored on two different shelves of the storage rack 100, but they also may be stored on the rack or on the floor in a side by side position. The material handling vehicle 2 moves toward the second material carrier 8 to insert the forks 14 through the slots 70, 72 in the second carrier and then backs away from the storage shelf 100 and moves toward the first carrier 6 to insert the forks 14 in its slots 48, 50. The forks 14 can be tilted upward at their outer ends during the loading of the carriers onto the forks and while the carriers are being transported by the forks as necessary to ensure that they are retained on the forks. In FIG. 6, the carriers 6 and 8 are shown in full lines supported on the forks 14 as the material handling vehicle 2 is moving away from the storage rack 100 to transport the carriers from the shelf location to the location of the material object 10 to be hauled.

It will be understood that the foregoing description of the present invention is for purposes of illustration only and that the invention is susceptible to a number of modifications or changes, none of which entail any departure from the spirit and scope of the present invention as defined in the hereto appended claims. For example, a different type of material handling vehicle may be utilized which may require modifications in the mode of support of the second material carrier 8 on the material handling vehicle. However, such modification would nevertheless be within the scope of the claims of the invention.

What is claimed is:

1. A material hauler for transporting a material object, the hauler being in movable engagement with a material handling vehicle travelable on a floor and having a load lifting and lowering means including a pair of vertically movable spaced apart forks extending substantially horizontally from the vehicle, comprising:

a first material carrier separate from the material object except during transport of the latter and including wheel means for permitting movement of the first material carrier along the floor;

a second material carrier spaced from the first material carrier, the second material carrier being movably supported on the forks relative to the forks whereby the second material carrier travels with the material handling vehicle; and said material object bridges the space between and is in engaging support with the first and second material carriers only during transport of the material object such that the first material carrier and the material object also travel with the material handling vehicle.

2. The material hauler according to claim 1 wherein the second material carrier is slidable on to and off of the forks in the direction of the length of the forks.

3. The material hauler according to claim 1 wherein the second material carrier comprises lower and upper members both supported only on the forks, the upper member being pivotal relative to the lower member and in supporting engagement with the material object whereby the lower member and material handling vehicle can turn relative to the upper member and the material object.

4. The material hauler according to claim 1 wherein:
the first material carrier has two openings alignable with the pair of forks;

the second material carrier has two openings alignable with the pair of forks; and the first and second material carriers have simultaneous transport positions above the floor in which each one of the pair of forks extends through one of the two openings in each of the material carriers, the carriers being supported on the forks and neither carrier engaging the material object in the transport position.

5. A method of hauling material objects with a material handling vehicle movable along a floor and having a load lifting and lowering means, including a pair of spaced apart forks extending substantially horizontally from the vehicle, comprising the steps of:
at a second location, placing the material handling vehicle opposite first and second material carriers with the forks spaced from and extending toward the carriers;

at the second location, extending a first one of the pair of forks through aligned openings in the first and second material carriers and extending the second one of the pair of forks through aligned openings in the first and second material carriers to support the material carriers on the pair of forks and transporting the first and second carriers on the pair of forks to a first location;

at the first location, removing the first material carrier form the forks and placing it at a position on the floor along which the first material carrier is also movable;

positioning the second material carrier on the forks at a distance form the first material carrier;

supporting a material object to be hauled in engagement with and bridging the distance between the first and second material carriers; and moving the material handling vehicle with the second material carrier above the floor so that the first material carrier moves with the material handling vehicle to thereby haul the material object.

6. The method according to claim 5 wherein the step of positioning the second material carrier on the load lifting and lowering means includes changing the position of the second material carrier to a carrying position on the load lifting and lowering means.

7. A material hauler for transporting a material object, the hauler being in movable engagement with a material handling vehicle travelable on a floor comprising:
a first material carrier separate from the material object except during transport of the latter and including wheel means for permitting movement of the first material carrier along the floor;

a second material carrier spaced from the first material carrier and supported on the material handling vehicle, the second material carrier including lower and upper members, the upper member being pivotal relative to the lower member whereby the lower member and the material handling vehicle can turn relative to the upper member; and said material object bridges the space between and is in supporting engagement with the first material carrier and the upper member of the second material carrier only during transport of the material object such that the first material carrier and the material object also travel with the material handling vehicle.

* * * * *